C. M. CULP.
EMERGENCY TIRE.
APPLICATION FILED APR. 24, 1909.
965,443.
Patented July 26, 1910.
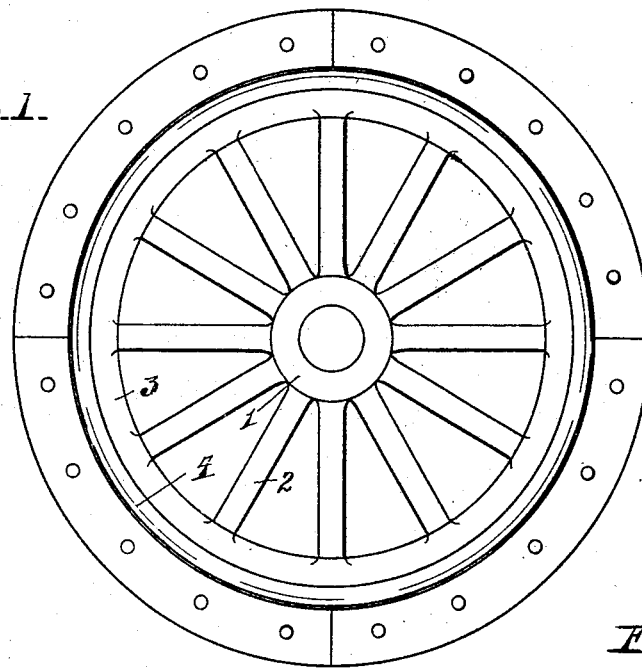
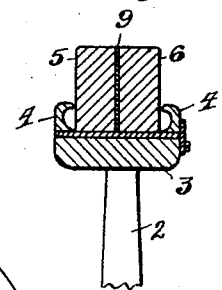
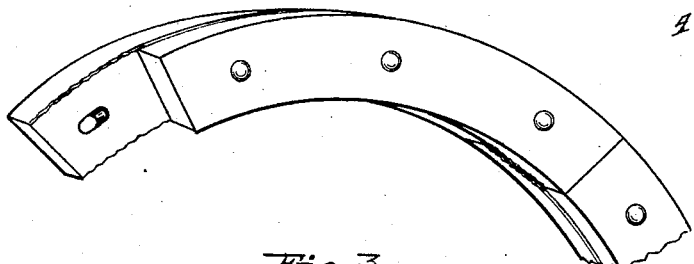
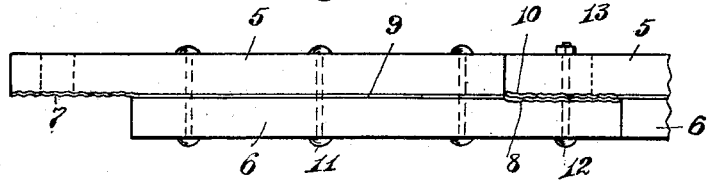
Witnesses:
George Oltsch
G. M. Cole.
Charles M. Culp.
Inventor.
By
Attny.

UNITED STATES PATENT OFFICE.

CHARLES M. CULP, OF SOUTH BEND, INDIANA.

EMERGENCY-TIRE.

965,443.  Specification of Letters Patent.  Patented July 26, 1910.

Application filed April 24, 1909. Serial No. 491,878.

*To all whom it may concern:*

Be it known that I, CHARLES M. CULP, a citizen of the United States, residing at South Bend, in the county of St. Joseph and State of Indiana, have invented certain new and useful Improvements in Emergency-Tires, of which the following is a specification.

This invention relates to emergency tires for automobiles and other vehicles.

One object of the invention is to provide a tire embodying such characteristics that it may be used continuously or temporarily substituted on an automobile or other vehicle using a clencher tire without special preparations being made to secure the tire to the rim.

Another object of the invention resides in the provision of an "emergency" tire which may be readily and quickly applied to wheels generally using the clencher tire so that in the event of leakage or other injury to the clencher tire, it may be replaced by my temporary or emergency tire, and thereby save the clencher tire from further or unnecessary damage as well as obviate the possibility of damaging the wheel proper incident to contact with the ground over a deflated tire.

Another object of the invention resides in the provision of an "emergency" tire composed of sections so that the same may be compactly stored away under the seat of an automobile or other place and be readily placed upon a wheel in substitution of the ordinary clencher tire in the event that the latter should become damaged or for any other purpose.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a side elevation of a wheel embodying my invention. Fig. 2 is a fragmentary perspective view of one type of my temporary tire. Fig. 3 is a plan view of the portion of the tire illustrated in Fig. 2. Fig. 4 is a fragmentary sectional view through the rim of a wheel illustrating my tire secured thereto.

Referring now more particularly to the accompanying drawings, I illustrate a wheel having the usual hub 1 and radiating spokes 2 and a rim 3 upon which latter may be secured the clencher flanges 4 in any well known manner, and which flanges are adapted to receive between them an ordinary clencher tire (not shown).

In the event of leakage of a pneumatic tire, it sometimes requires abandonment of the vehicle because of the deflation of the tire. It frequently occurs that drivers of the vehicle continue on the journey with one tire deflated which results in more or less damage to the rim of the wheel. Sometimes, a separate tire is carried on the vehicle for use in the event of accident to one of the tires, but the substitute tire is more or less in the way and the inconvenience of carrying the substitute tire is more or less manifest. I have therefore provided a temporary tire to be used in substitution of the ordinary clencher tire in the event that the latter should be become damaged, and my improved temporary tire is composed of four sections more or less, each section comprising members 5 and 6, respectively, one end of the member 5 projecting beyond the corresponding end of the other member 6 and corrugated or otherwise roughened, as indicated at 7, while the other end of the member 6 projects beyond the corresponding end of the member 5 and it, too, is corrugated, or otherwise roughened, as indicated at 8.

By virtue of the projecting ends of the members with respect to each other, I provide for an overlapping of the adjacent sections, as clearly indicated in Fig. 3, and between the members 5 and 6 of each section I preferably dispose a metallic or other filling member 9, whose ends are corrugated or roughened, as indicated clearly at 10 in Fig. 3 for engagement with the corrugated or roughened faces 7 and 8 of the members 5 and 6 of each section, and which insures a firm connection between the sections, preventing them from slipping away from each other or laterally with respect to each other.

The members 5 and 6 of the sections may be formed of rubber or of any other suitable material, and in the event of a puncture or it be desired for other reasons to remove the ordinary clencher tire (not shown), it may be removed in the usual manner and my improved sectional emergency tire substituted therefor without altering the means by which the ordinary clencher tire is held upon the rim and without in any way securing my improved temporary tire to the rim by the employment of fastenings leading from the rim into the temporary tire, or from the temporary tire into the rim. I simply place the temporary tire upon the rim, as is the case with the clencher tire, first securing the members 5 and 6 of each section together with the plates 9 between them through the instrumentality of suitable bolts or other fastenings 11. The sections are then placed upon the rim in the overlapping relation hereinbefore mentioned, and in their overlapping relation firmly secured together by means of the bolts 12, which latter are each provided with a nut 13 so that the sections may be readily separated when desired, although the members 5 and 6 and their filling pieces 9 are preferably permanently connected together by virtue of the ends of the bolts 11 being upset, as clearly shown in the drawings.

It will be noted that the openings 14 in the projecting ends of each section are elongated so that the size of the emergency tire, when the sections are assembled, will be slightly increased or decreased, so as to enable the emergency tire to have a tight grip upon wheels of larger or smaller diameters. If there should be any space between the ends of the sections, by virtue of the overlapping ends, the tread would still be continuous so that there would be no jarring or bumping, as would be the case if there were gaps between the sections.

From the foregoing, it will be readily seen that I provide a "temporary" tire composed of sections whereby it may be readily stored away in an automobile or other place and whereby it may be readily shipped or transported from one place to another. It will also be seen that the tire is exceedingly simple in construction and that it may be readily removed from a wheel and as readily placed thereon.

What is claimed is:—

1. An emergency tire for wheels comprising a plurality of sections, each section composed of a plurality of members, whose ends break joint with each other, the members of each section being rigidly secured together, a metallic filling member between the members of each section and having transverse corrugations near its ends, and means passing through the ends of each section for detachably securing the sections together.

2. An emergency tire for wheels comprising overlapping sections detachably secured together, each section composed of a plurality of arcuate members rigidly secured together, one of the members projecting at one end beyond the corresponding end of the other member and the other member projecting beyond the corresponding other end of the first mentioned member, the projecting ends of the members of each section being provided with elongated openings, and means passing through the elongated openings for coöperation therewith to adjustably secure the sections together.

In testimony whereof I affix my signature, in presence of two witnesses.

CHARLES M. CULP.

Witnesses:
GEORGE OLTSCH,
G. M. COLE.